(12) United States Patent
Smith et al.

(10) Patent No.: US 7,712,778 B2
(45) Date of Patent: May 11, 2010

(54) DUAL STAGE CYLINDRICAL INFLATOR WITH OUTSIDE TO INSIDE AXIAL FLOW

(75) Inventors: Bradley W. Smith, Plain City, UT (US); David W. Parkinson, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 67 days.

(21) Appl. No.: 11/978,254

(22) Filed: Oct. 29, 2007

(65) Prior Publication Data

US 2009/0108572 A1   Apr. 30, 2009

(51) Int. Cl.
 B60R 21/26 (2006.01)
(52) U.S. Cl. .................. 280/736; 280/740; 280/742
(58) Field of Classification Search ............ 280/736, 280/740, 737, 741, 742; B60R 21/26, 21/264
 See application file for complete search history.

(56) References Cited

U.S. PATENT DOCUMENTS

| 5,779,266 | A | * | 7/1998 | Moore et al. | 280/737 |
| 5,845,933 | A | * | 12/1998 | Walker et al. | 280/741 |
| 2002/0190511 | A1 | * | 12/2002 | Watase et al. | 280/740 |
| 2005/0098988 | A1 | | 5/2005 | Smith | |
| 2005/0123406 | A1 | | 6/2005 | Clark et al. | |
| 2005/0206144 | A1 | * | 9/2005 | Numoto et al. | 280/736 |

FOREIGN PATENT DOCUMENTS

JP   2005-231571   *   9/2005

* cited by examiner

Primary Examiner—Paul N Dickson
Assistant Examiner—Jordan Golomb
(74) Attorney, Agent, or Firm—Sally J Brown; Madson IP, P.C.

(57) ABSTRACT

A new type of inflator that may be used to inflate an airbag is disclosed. The inflator will have a longitudinal axis, a first chamber, and a filter. The filter may be positioned outside of the first chamber. A first quantity of gas generant is positioned within the first chamber. A first strainer having a plurality of gas flow holes is also positioned within the first chamber. The first quantity of gas generant is located exterior of the strainer. Upon combustion of the first quantity of gas generant produces a first quantity of gas that flows towards the longitudinal axis while passing through the gas flow holes, enters the filter, and then flows away from the longitudinal axis while passing through the filter.

19 Claims, 8 Drawing Sheets

DUAL STAGE CYLINDRICAL INFLATOR WITH OUTSIDE TO INSIDE AXIAL FLOW

BACKGROUND OF THE INVENTION

Airbags and airbag systems are known in the art and are now standard on motor vehicles. These airbag systems generally are designed such that in the event of an accident or a crash, an inflatable airbag will become positioned in front of a vehicle occupant and will prevent the vehicle occupant from harmful impact with a portion of the vehicle interior. As is known in the art, airbags are currently added to the vehicle's steering wheel, dashboard, and/or at other locations within the vehicle. The inclusion of these airbag systems within motor vehicles have been credited with saving many lives and preventing many injuries.

In order to inflate the airbag during a crash, an airbag inflator is often used. The airbag inflator is a device that will produce and/or channel a large quantity of inflation gas into the airbag upon activation. Some inflators include a supply of a pyrotechnic (gas generating) material housed within the inflator. Upon activation, the pyrotechnic material will ignite and will produce a quantity of inflation gas that may be used to deploy the airbag.

As vehicle airbags have become larger and more complex, it has become necessary, in certain situations, to use larger, more complex inflators in order to provide a quantity of gas sufficient to rapidly deploy the airbag. This requirement for larger, more complex inflators is especially prevalent in front seat passenger, dashboard mounted airbag systems. Unfortunately, the use of such large and complex airbag inflators is often very expensive and greatly increases the overall cost of the airbag system.

In many embodiments, these large, complex inflators will often have a multiplicity of small components that must be assembled as part of the airbag inflator. Assembly of these small, complex components is often difficult and increases the manufacturing costs. Accordingly, there is a need in the art for a new type of airbag inflator that is simple, small, and may be inexpensively and easily manufactured. Such a device is disclosed herein.

BRIEF SUMMARY OF THE INVENTION

Embodiments of an inflator are disclosed herein. The inflator has a longitudinal axis and a first chamber. The first chamber comprises a quantity of gas generant. A first strainer comprising a plurality of gas flow holes is also positioned within the first chamber. The first quantity of gas generant is located exterior of the strainer. A filter may also be added to the inflator. In some embodiments, the filter is positioned outside of the chamber. A burst disk may also be positioned between the first chamber and the filter. Further embodiments may be designed in which a first initiator is molded to the first chamber.

The first quantity of gas generant may be ignited to produce a first quantity of gas. This gas flows radially inward towards the longitudinal axis through the gas flow holes in the first strainer, through the orifice plate to enter the filter, and then flows away from the longitudinal axis through the filter. After flowing through the filter, the first quantity of gas exits the inflator through one or more exit ports. In some embodiments, the ignition of the first quantity of gas generant occurs exterior to the first strainer.

A second chamber may also be added to the inflator. The second chamber is positioned at a second end of the filter whereas the first chamber is positioned at a first end of the filter. The second chamber comprises a second quantity of gas generant and a second strainer. The second strainer comprises a plurality of gas flow holes. The second supply of gas generant is located exterior of the second strainer. These embodiments are designed such that ignition of the second quantity of gas generant produces a second quantity of gas. In some embodiments, ignition of the second quantity of gas generant occurs exterior of the second strainer. Ignition of the second quantity of gas generant may be accomplished via a second initiator that is molded to the second chamber. In some embodiments, the first quantity of gas generant, the second quantity of gas generant, and/or both the first quantity of gas generant and the second quantity of gas generant may be made into disk-shaped wafers.

Once the second quantity of gas has been formed via ignition of the second quantity gas generant, the second quantity of gas flows radially inward towards the longitudinal axis while passing through the gas flow holes in the second strainer. Once the gas has passed through the gas flow holes, the gas flows through the orifice plate and enters the filter, and then flows away from the longitudinal axis through the filter.

Another type of inflator having a longitudinal axis may be constructed in accordance with the present embodiments. The inflator has a first chamber that includes a first quantity of gas generant and a first strainer. The first strainer includes one or more gas flow holes. The first quantity of gas generant is located exterior of the first strainer. The first quantity of gas generant may be ignited exterior of the first strainer to produce a first quantity of gas. The first quantity of gas flows towards the longitudinal axis while passing through the gas flow holes, exits the first chamber through the orifice plate, and then flows away from the longitudinal axis as it exits the inflator. A second chamber may also be added to this inflator. The first chamber is positioned at a first end of the inflator and the second chamber is positioned at a second end of the inflator. The second chamber has a second quantity of gas generant and a second strainer. In some embodiments, the second quantity of gas generant and/or the first quantity of gas generant will be made of wafers. The second quantity of gas generant is located exterior of the second strainer. The second quantity of gas generant may be ignited. Such ignition of the second quantity of gas generant occurs exterior of the second strainer and produces a second quantity of gas that flows towards the longitudinal axis while passing through one or more gas flow holes in the second strainer, exits the second chamber through the orifice plate and then flows away from the longitudinal axis as it exits the inflator.

The present embodiments also disclose a method for deploying an airbag inflator having a longitudinal axis. The steps in this method may include obtaining an inflator that comprises a first chamber and a filter. The filter is positioned outside of the first chamber. A first quantity of gas generant is added to the first chamber. A first strainer is also added to the first chamber. The first strainer includes a plurality of gas flow holes. The first quantity of gas generant is located exterior of the first strainer. Once the inflator has been activated, the initiator ignites the first quantity of gas generant to produce a first quantity of gas. This ignition of the first quantity gas generant occurs exterior to the first strainer. Once the first quantity of gas is produced, this gas is vented out of the inflator. This venting occurs by having the gas flow towards the longitudinal axis while passing through the gas flow holes through the orifice plate to enter the filter, and then flow away from the longitudinal axis as it passes through the filter and exits the inflator.

If the inflator comprises a second chamber, then additional steps to the above-recited method are also possible. The second chamber is positioned at a second end of the filter whereas the first chamber is positioned at a first end of the filter. The second chamber comprises a second supply of gas generant and a second strainer. The second strainer includes a plurality of gas flow holes. The second quantity of gas generant is located exterior of the second strainer. These embodiments may include the additional step of igniting the second quantity of gas generant to produce a second quantity of gas. This second quantity of gas flows towards the longitudinal axis as it passes through the gas flow holes in the second strainer, enters the filter, and then flow away from the longitudinal axis as it passes through the filter and exits the inflator. Further steps may include mixing the second quantity of gas with the first quantity of gas in the filter.

The present embodiments are designed to overcome or address one or more of the limitations associated with previously known inflators. Accordingly, the present embodiments relate to inflator(s) having a longitudinal axis. The inflator may be cylindrical in shape. The longitudinal axis is positioned at the center of the cylindrical-shaped inflator.

The inflator comprises a first chamber and a filter. The filter may be positioned outside of the first chamber. The filter is designed to filter inflation gas prior to the supply of gas exiting the inflator. The filter prevents debris, fragments, and/or other particles produced during combustion of the gas generant from exiting the inflator. A first burst disk may also be added to seal the first chamber.

The first chamber includes a first quantity of gas generant that will generally surround a first strainer. The first strainer may be a cylindrically-shaped component and will have one or more gas flow holes. The gas flow holes are designed such that gas produced from ignition/combustion of the first quantity of gas may pass through the gas flow holes.

The inflator is designed such that the first quantity of gas generant is located exterior of the first strainer. The term "exterior of the first strainer" refers to relative positions of the first quantity of gas generant and the first strainer with respect to the longitudinal axis. The first strainer is positioned closer to the longitudinal axis than is the first quantity of gas generant.

A first initiator may also be added to the first chamber. The first initiator is capable of igniting the first quantity of gas generant upon receipt of the appropriate signal. In the event of an accident or crash, an electrical charge or current will be supplied to the initiator via one or more wires, thereby activating the initiator. Once activated, the initiator ignites the first quantity of gas generant which combusts to produce a volume of inflation gas.

A second chamber may also be included as part of the inflator. In some embodiments, the first chamber is positioned at a first end of the inflator and the second chamber is positioned at a second end of the inflator. The second chamber may be sealed by a second burst disk.

The second chamber may comprise a second quantity of gas generant and a second initiator. As with the first initiator, the second initiator is designed to ignite the second quantity of gas generant which combusts to create a quantity of inflation gas. A second strainer is also added to the second chamber. The second strainer comprises a plurality of gas flow holes through which a supply of inflation gas may pass. In other words, when the second supply of gas generant is combusted, this material will produce a quantity of inflation gas. This inflation gas will then pass through the gas flow holes in the second strainer. Like the first chamber, the second chamber may be constructed such that the second quantity of gas generant is positioned exterior of the second strainer. This means that the second strainer is positioned at or closer to the longitudinal axis than is the second quantity of gas generant.

As noted above, the first quantity of gas generant is generally positioned exterior of the first strainer. Accordingly, the ignition of the first quantity of gas generant occurs exterior to the first strainer and produces a first quantity of inflation gas. When the first quantity of inflation gas is formed, this gas is positioned (at least initially) exterior of the first strainer.

The formation of the first quantity of inflation gas increases the pressure within the first chamber. Once this internal pressure exceeds a threshold level, the pressure will fail the first burst disk. Such failing of the burst disk unseals the first chamber.

Upon formation, the first quantity of gas flows inwardly towards the longitudinal axis of the inflator. Generally, this inward flow of the first quantity of gas occurs as the gas passes through the gas flow holes on the first strainer. After passing through the gas flow holes, the first quantity of gas may then exit the first chamber. Such exiting of the first chamber may occur by having the gas flow parallel (or substantially parallel) to the longitudinal axis through the opening created by the rupture/failure of the first burst disk. Once the gas has exited the first chamber, the gas may then flow through the filter and exit the inflator. In general, as the gas flows through the filter, it will flow away from the longitudinal axis (i.e., outwardly).

The second chamber may also be deployed and used to generate inflation gas. This deployment occurs when a signal is sent to the second initiator, which in turn, ignites the second quantity of gas generant. Because the second quantity of gas generant is generally positioned exterior of the second strainer, this ignition of the second quantity of gas generant occurs exterior to the second strainer. Combustion of the second quantity of gas generant produces a second quantity of inflation gas. The formation of the second quantity of gas within the second chamber increases the pressure within this sealed chamber. Once this internal pressure increases above a specified, threshold level, the internal pressure unseals the second chamber by failing the second burst disk.

When the second quantity of inflation gas is formed, this gas is positioned (at least initially) exterior of the second strainer. The second quantity of gas moves through the gas flow holes found in the second strainer. In order to pass through the flow holes, the gas moves inwardly—i.e., towards the longitudinal axis of the inflator. Once the second quantity of gas has passed through the gas flow holes in the second strainer, the second quantity of gas may then flow out of the second chamber. This flow of the second gas out of the second chamber occurs by having the gas flow parallel (or substantially parallel) to the longitudinal axis through the opening in the second chamber created by the rupture/failing of the burst disk. Upon exiting the second chamber, the second quantity of gas may then flow away from the longitudinal axis (i.e., outwardly) as it passes through the filter. Once the second quantity of gas has passed through the filter, the gas may exit the inflator.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
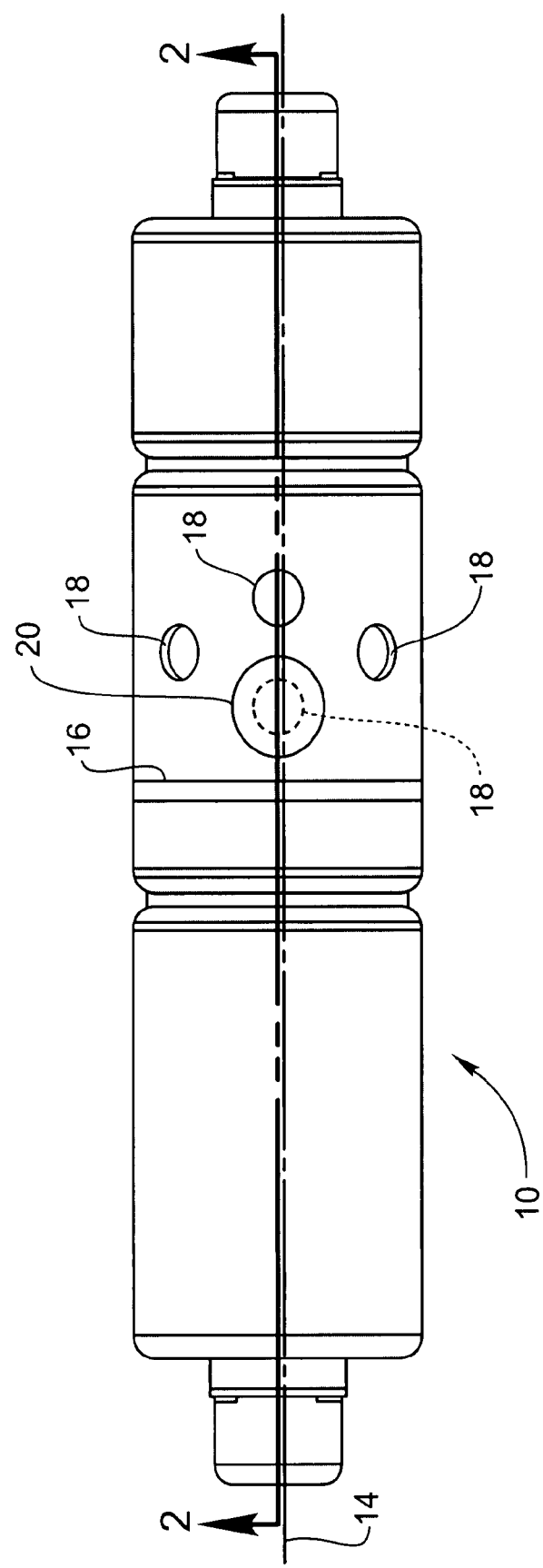
FIG. 1 is a side elevational view of an inflator according to the present embodiments.

Referring now to FIG. 1, an inflator 10 according to the present embodiments is illustrated. The inflator 10 may be generally cylindrical in shape and has a longitudinal axis 14 that extends along the length of the inflator 10. In the embodiment of FIG. 1, the longitudinal axis 14 is positioned at the center of the cylindrical-shaped inflator 10.

The inflator 10 is generally made of metal (or other suitable material). In the embodiment shown in FIG. 1, the inflator 10 comprises two distinct components (which are tube-shaped) that have been attached together via welds 16. Of course, those of skill in the art will recognize other ways and/or methods for constructing the inflator 10. In some embodiments, only one weld 16 is used to connect the components of the inflator 1 as opposed to multiple welds. This weld 16 may be in the form of a straight line, may be curved, or may have other profiles. However, further embodiments may be designed in which multiple welds 16 are used.

The inflator 10 is capable of inflating/deploying an airbag (not shown) in the event of an accident or crash. More specifically, in the event of an accident or crash, the inflator 10 will produce and/or channel a quantity of inflation gas that exits the inflator 10 via exit ports 18, thereby causing the airbag to deploy into a position that will provide impact protection to the vehicle occupant. In some embodiments, a seal 20 made of foil or other similar materials may be added to seal one or more of the exit ports 18 prior to deployment. However, during deployment of the inflator 10, the seal 20 will be removed, torn, or otherwise disabled so that inflation gas can exit the inflator 10.

As will be explained in greater detail below, the inflator 10 may be lighter-weight than other previously known inflators. In fact, in some embodiments, the inflator 10 will have a mass of about 750 grams. In other embodiments, the length of the inflator 10 will be 175 millimeter and the diameter of the cylindrical inflator 10 will be about 45 millimeters. Of course, other dimensions, sizes and/or weights of the inflator 10 are also possible.

Figure 2:
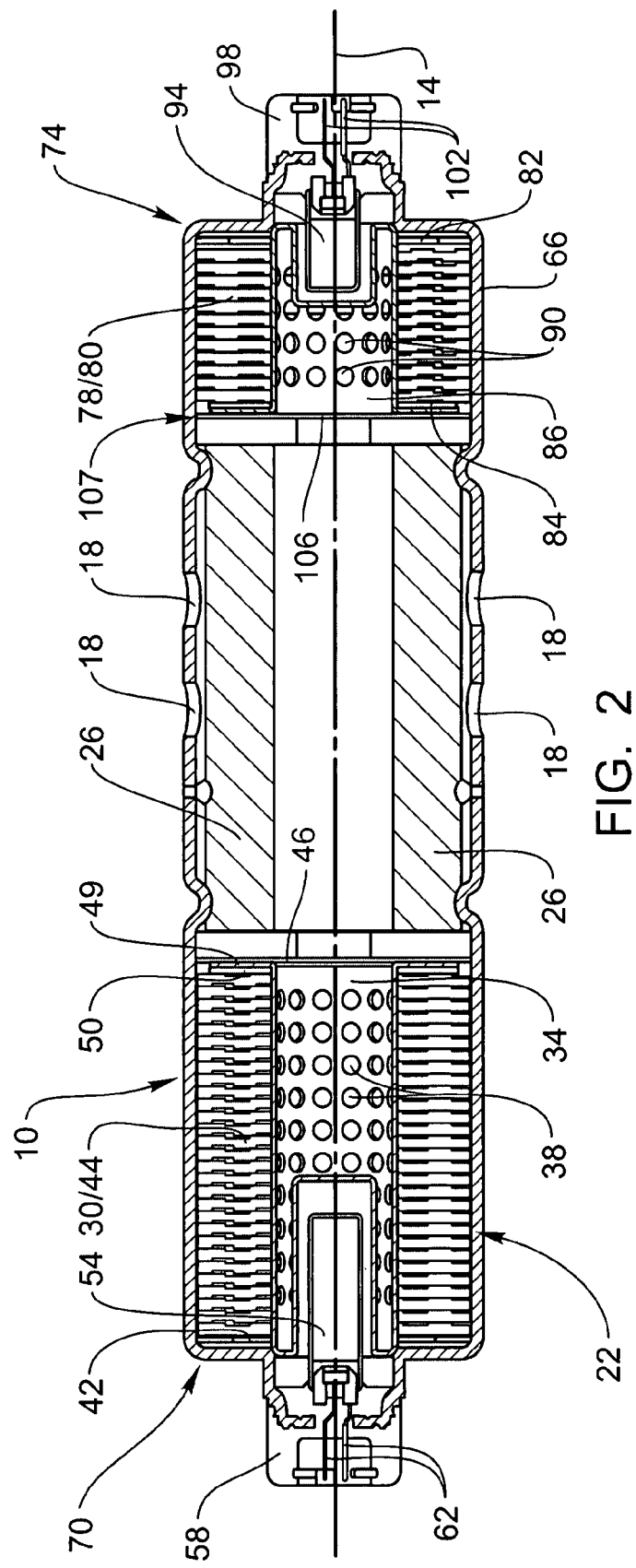
FIG. 2 is a cross-sectional view of the inflator of FIG. 1 taken along the line 2-2.

Referring now to FIG. 2, a cross-sectional view of the inflator 10 is illustrated. The inflator 10 comprises a first chamber 22 and a filter 26. The filter 26 may be positioned outside of the first chamber 22. The filter 26 is also positioned proximate the exit ports 18. The filter 26 is made of a material known in the art and is designed to filter/screen inflation gas prior to the supply of gas exiting the inflator 10 via the exit ports 18. In general, the filter 26 will prevent debris, fragments, and/or other particles produced during ignition of the inflator 10 from entering the airbag (not shown).

The first chamber 22 will include a first quantity of gas generant 30. As is known in the art, a gas generant is a pyrotechnic or other similar material that is capable of producing a supply of gas when the material is combusted. A variety of different types of gas generant material are known in the art. Any type of material that is capable of producing a quantity of gas upon combustion may be used as the first quantity of gas generant 30.

The first quantity of gas generant 30 generally surrounds a first strainer 34. The first strainer 34 is a cylindrical shaped component that has one or more gas flow holes 38. The gas flow holes 38 are designed such that gas produced from combustion of the first quantity of gas generant 30 may pass through the gas flow holes 38. Embodiments may be constructed in which the shape, configuration, or size of the gas flow holes 38 are designed such that certain particulates, fragments, and/or other undesirable products produced in the combustion of the first quantity of gas generant 30 will be restrained by the first strainer 34 and will be prevented from exiting the first chamber 22.

In some embodiments, it may be preferable to have the first quantity of gas generant 30 comprise one or more wafers 44. The wafers 44 may be disk-shaped. These disk-shaped wafers 44 may have an opening in the center. These wafers 44 are stacked to generally span the longitudinal length of the first chamber 22. The first strainer 34 fits into the openings of the wafers 44 so that the wafers 44 are positioned exterior to the first strainer 34.

By packing the first chamber 22 with wafer-shaped gas generant 30/44, it is known in the art that a more consistent combustion pressure can be obtained when the first quantity of gas generant 30 is ignited. Also, the use of wafers 44 can improve the effluents formed by ignition and reduce the amount/quantity of undesirable particles, fragments, etc. Moreover, the use of wafers 44 also allows a simple and easy introduction/orientation of the first quantity of gas generant 30. In fact, in some embodiments, a gas generant retainer ring 42 may be added to facilitate the stacking/packing and/or retention of the wafer-shaped gas generant 30/44. Accordingly, for these and other reasons, the use of wafers 44 as the first quantity of gas generant 30 may be preferred in some embodiments.

As can be seen in FIG. 2, the inflator 10 is designed such that the first quantity of gas generant 30 is located exterior of the first strainer 34. As used herein, the term "exterior of the first strainer" refers to relative positions of the first quantity of gas generant 30 and the first strainer 34 with respect to the longitudinal axis 14 of the inflator 10. Positioning the first quantity of gas generant 30 exterior of the first strainer 34 means that the first strainer 34 is positioned closer to the longitudinal axis 14 than is the first quantity of gas generant 30. In the specific embodiment shown in FIG. 2, the first strainer 34 is positioned interior of (inward) the first quantity of gas generant 30.

A first burst disk 46 may also be positioned within the first chamber 22. The burst disk 46 is positioned adjacent to a first end 49 of the first chamber 22 and operates to separate the first chamber 22 from the filter 26. The burst disk 46 seals the first chamber 22 such that the first chamber 22 is a closed chamber. In the embodiment shown in FIG. 2, the burst disk 46 spans the entire circular width of the first chamber 22. However, in other embodiments, the burst disk 46 may have a different size, shape and/or configuration. In other embodiments, the first burst disk 46 may be positioned outside of the first chamber 22.

A damper pad 50 may also be positioned on the interior of the first chamber 22. The damper pad 50 is positioned adjacent to the burst disk 46. In some embodiments, the damper pad 50 is designed to dampen/absorb some of the force associated with ignition/combustion of the first quantity of gas generant 30.

A first initiator 54 may also be added to the first chamber 22. The first initiator 54 is a device of the type known in the art and is capable of igniting the first quantity of gas generant 30 upon receipt of the appropriate signal. In the embodiment shown in FIG. 2, the first initiator 54 is positioned adjacent to the first strainer 34. The first initiator 54 may be directly molded into the inflator 10, thereby obviating the need for an "ignition cup." (An ignition cup is a device commonly used for igniting the gas generant. The ignition cup may also contain an additional pyrotechnic charge which "boosts" the output of the initiator to facilitate ignition of the gas generant). Without this ignition cup, the number of components needed to construct the inflator 10 is reduced and the overall cost and complexity of the inflator 10 is decreased.

A connector socket 58 that connects the first initiator 54 may also be added. The connector socket 58 comprises one or more pins/wires 62. In the event of an accident or crash, an electrical charge or current will be supplied to the initiator 54 via the pins 62, thereby activating the initiator 54. Once activated, the initiator 54 ignites/combusts the first quantity of gas generant 30 and produces a volume of inflation gas.

Figure 2A:
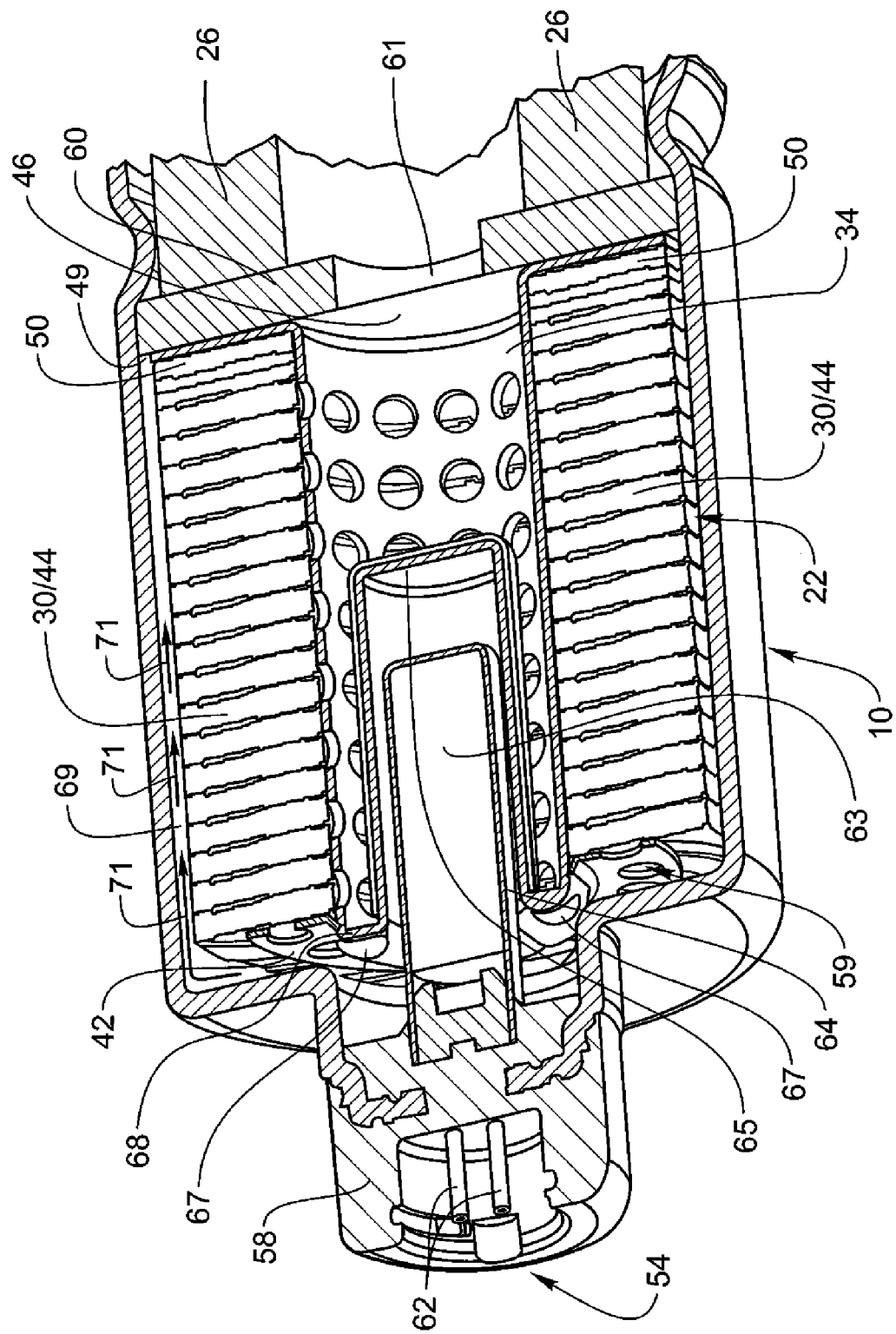
FIG. 2A is a cutaway perspective view of the first chamber of FIG. 2.

Referring now to FIG. 2A, a perspective view illustrates the components of the first chamber 22 in greater detail. Specifically, FIG. 2A shows the components of the first chamber 22. As can be seen in FIG. 2A, the gas generant retainer ring 42 (which is also referred to as the wafer retainer) may be constructed of metal and may have one or more holes 59. In some embodiments, the ring 42 and/or the holes 59 may engage a portion of the wafers 44. The retainer ring 42 and/or the holes 59 may be configured to facilitate the stacking and/or retention of the wafers 44.

Further, an orifice plate 60 may be positioned at the end 49 of the first chamber 22. The orifice plate 60 comprises an orifice 61 that is, prior to deployment, sealed by the burst disk 46. The orifice plate 60 separates the first chamber 22 from the filter 26. In some embodiments, the burst disk 46 will be made of foil or other similar materials.

The first initiator 54 is shown in greater detail in FIG. 2A. The first initiator 54 may be positioned interior of the first strainer 34. The first initiator 54 may comprise a pyrotechnic charge 63. A variety of different materials known in the art may be used as the pyrotechnic charge 63. The pyrotechnic charge 63 is designed such that it may be ignited when the appropriate signal is received via the pins 62. An initiator cup 64 may also be added to surround the pyrotechnic charge 63.

The strainer 34 may additionally comprise a redirecting portion 65 and one or more gas guide slots 67. (The way in which this gas flows during deployment is shown and described in conjunction with FIGS. 3A and 3B.) The gas guide slots 67 may be located around the top 68 of the strainer 34. The redirecting portion 65 and the slots 67 may be used to redirect gas (and/or flames and/or hot particles) produced during ignition/combustion of the pyrotechnic charge 63. Specifically, upon ignition of the pyrotechnic charge 63, the flames/gas will exit the initiator cup 64 and may contact the redirecting portion 65. The redirecting portion 65 (which may be a wall, a channel, etc.) directs (or redirects) the gas/flames towards the gas guide slots 67. Once the flame/gas reaches the gas guide slots 67, the gas/flames are channeled exterior of the wafers 44 into the external area 69. The external area 69 may be positioned exterior of the wafers. In some embodiments, the gas guide slots 67 comprise indentations, slots, channels or other feature(s) that direct the flames/gas into the external area 69. As will be explained in greater detail herein, once the flame/gas reaches the external area 69, combustion of the wafers 44 may occur. (Although described in greater detail below, this flow of gas is illustrated in FIG. 2A as arrows 71.)

Referring again to FIG. 2, those of skill in the art will appreciate that embodiments of the inflator 10 may be constructed in which the inflator 10 has only the first chamber 22. However, further embodiments, including the embodiment of FIG. 2, may be constructed in which a second chamber 66 is added to the inflator 10. The first chamber 22 is positioned at a first end 70 of the inflator 10 and the second chamber 66 is positioned at a second end 74 of the inflator 10. Other embodiments may also be constructed in which the first chamber 22 and/or the second chamber 66 are positioned proximate the middle (or a middle portion) of the inflator 10. Further embodiments may be constructed in which the first chamber 22 is positioned at the second end 74 and the second chamber 66 is positioned at the first end 70.

The second chamber 66 may comprise a second quantity of gas generant 78. As with the first quantity of gas generant 30, the second quantity of gas generant 78 may comprise one or more wafers 80 (such as disk-shaped wafers) that are stacked and oriented using a second gas generant retainer ring 82. As noted above, the use of wafers 80 as the gas generant may provide advantages over other types of gas generant materials. Accordingly, the use of wafers 80 as the second quantity of gas generant 78 may, in some embodiments, be preferred. A damper pad 84 may also be positioned on the interior of the second chamber 66. In some embodiments, the damper pad 84 is designed to dampen/absorb some of the force associated with ignition/combustion of the second quantity of gas generant 78.

As shown in FIG. 2, the second chamber 66 is smaller (in size and volume) than the first chamber 22. As a result, the amount of material used as the second quantity of gas generant 78 is less than the amount of material used as the first quantity of gas generant 30. Other embodiments may be constructed in which the amount of material used for the second quantity of gas genenant 78 may be equal to or greater than the amount of material used for the first quantity of gas generant 30. Still further embodiments may be designed in which the size/volume of the second chamber 66 is equal to or greater than the size/volume of the first chamber 22. Likewise, other embodiments may be constructed in which the shape of the first chamber 22 or the second chamber 66 is not cylindrical.

A second strainer 86 is also added to the second chamber 66. The second strainer 86 comprises a plurality of gas flow holes 90 through which a supply of inflation gas may pass. In other words, when the second supply of gas generant 78 is combusted, this material will produce a quantity of inflation gas. This inflation gas will then pass through the gas flow holes 90 in the second strainer 86 (so that this gas may, ultimately, be vented out of the inflator 10). In some embodiments, the shape, configuration, or size of the gas flow holes 90 will be designed such that certain particulates, fragments, and/or other undesirable products produced in the combustion of the second quantity of gas generant 78 will be restrained by the second strainer 86 and will be prevented from exiting the second chamber 66.

As with the first quantity of gas generant 30, the second quantity of gas generant 78 may be disk-shaped and have an opening proximate the center. Accordingly, the second strainer 86 may be positioned within the opening of the gas generant 78. In these embodiments, the second quantity of gas generant 78 is positioned exterior of the second strainer 86—that is the second strainer 86 is positioned at or closer to the longitudinal axis 14 than is the second quantity of gas generant 78.

A second initiator 94 is also positioned within the second chamber 66. The second initiator 94 is designed to ignite the second quantity of gas generant 78 to create a quantity of inflation gas that may be used to deploy an airbag. In the embodiment shown in FIG. 2, the second initiator 94 is positioned adjacent to the second strainer 86. Like the first initiator 54 discussed above, the second initiator 94 may be directly molded into the inflator 10, thereby obviating the need for an ignition cup. Without this ignition cup, the number of components needed to construct the inflator 10 is reduced and the overall cost and complexity of the inflator 10 is decreased.

A second connector socket 98 that connects the second initiator 94 may also be added. The connector socket 98 comprises one or more pins 102. In the event of an accident or crash, an electrical charge or current will be supplied to the second initiator 94 via the pins 102, thereby activating the second initiator 94. Once activated, the initiator 94 ignites/combusts the second quantity of gas generant 78 and produces a volume of inflation gas.

A second burst disk 106 is used to seal the second chamber 66. The second burst disk 106 may be positioned either inside of or outside of the second chamber 66. As shown in FIG. 2, the second burst disk 106 is positioned adjacent to an end 107 of the second chamber 66 and operates to separate the second chamber 66 from the filter 26. The burst disk 106 seals the second chamber 66 and makes the second chamber 66 a closed chamber. In the embodiment shown in FIG. 2, the burst disk 106 spans the entire circular width (i.e., diameter) of the second chamber 66. However, in other embodiments, the burst disk 106 may be have a different size, shape and/or configuration.

Figure 2B:
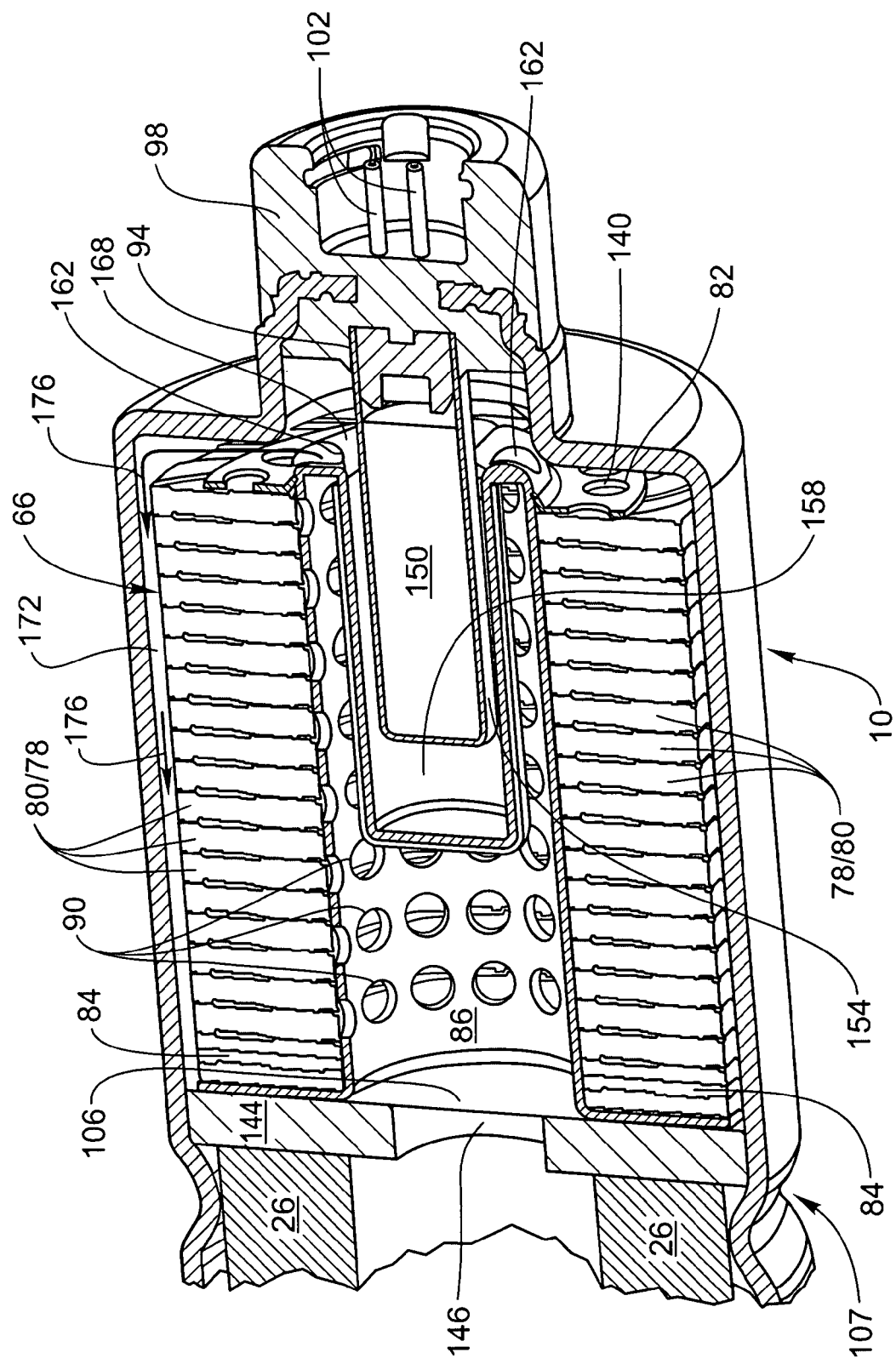
FIG. 2B is a cutaway perspective view of the second chamber of FIG. 2.

Referring now to FIG. 2B, the second chamber 66 may be shown in greater detail. FIG. 2B is a perspective view that is similar to FIG. 2A, except that FIG. 2B shows the components/features of the second chamber 66.

As can be seen in FIG. 2B, the gas generant retainer ring 82 (which is also referred to as the wafer retainer) may be constructed of metal and may have one or more holes 140. In some embodiments, the ring 82 and/or the holes 140 may engage a portion of the wafers 80. The retainer ring 82 and/or the holes 140 may be configured to facilitate the stacking and/or retention of the wafers 80.

Further, an orifice plate 144 may be positioned at an end 107 of the second chamber 66. The orifice plate 144 comprises an orifice 146 that is, prior to deployment, sealed by the second burst disk 106. The orifice plate 144 separates the second chamber 66 from the filter 26. In some embodiments, the second burst disk 106 will be made of foil or other similar materials.

The second initiator 94 is shown in greater detail in FIG. 2B. The initiator 94 may be positioned interior of the second strainer 86. The second initiator 94 may comprise a pyrotechnic charge 150. A variety of different materials known in the art may be used as the pyrotechnic charge 150. The pyrotechnic charge 150 is designed such that it may be ignited when the appropriate signal is received via the wires 102. An initiator cup 154 may also be added to surround the pyrotechnic charge 150.

The second strainer 86 may additionally comprise a redirecting portion 158 and one or more gas guide slots 162. The gas guide slots 162 may be located around the top 168 of the strainer 86. The redirecting portion 158 and the slots 162 may be used to redirect gas (and/or flames) produced during ignition/combustion of the pyrotechnic charge 150. Specifically, upon ignition of the pyrotechnic charge 150, the flames/gas and/or hot particles will exit the initiator cup 154 and may contact the redirecting portion 158. The redirecting portion 158 (which may be a wall, a channel, etc.) directs (or redirects) the gas/flames and/or hot particles towards the gas guide slots 162. Once the flame/gas reaches the gas guide slots 162, the gas/flames are channeled exterior of the wafers 80 into the external area 172 (as shown by arrows 176). The external area 172 may be positioned exterior of the wafers 80. In some embodiments, the gas guide slots 162 comprise indentations, slots, channels or other feature(s) that direct the flames/gas and/or hot particles into the external area 172. As will be explained in greater detail herein, once the flame/gas and/or hot particles reaches the external area 172, combustion of the wafers 80 may occur.

Figure 2C:
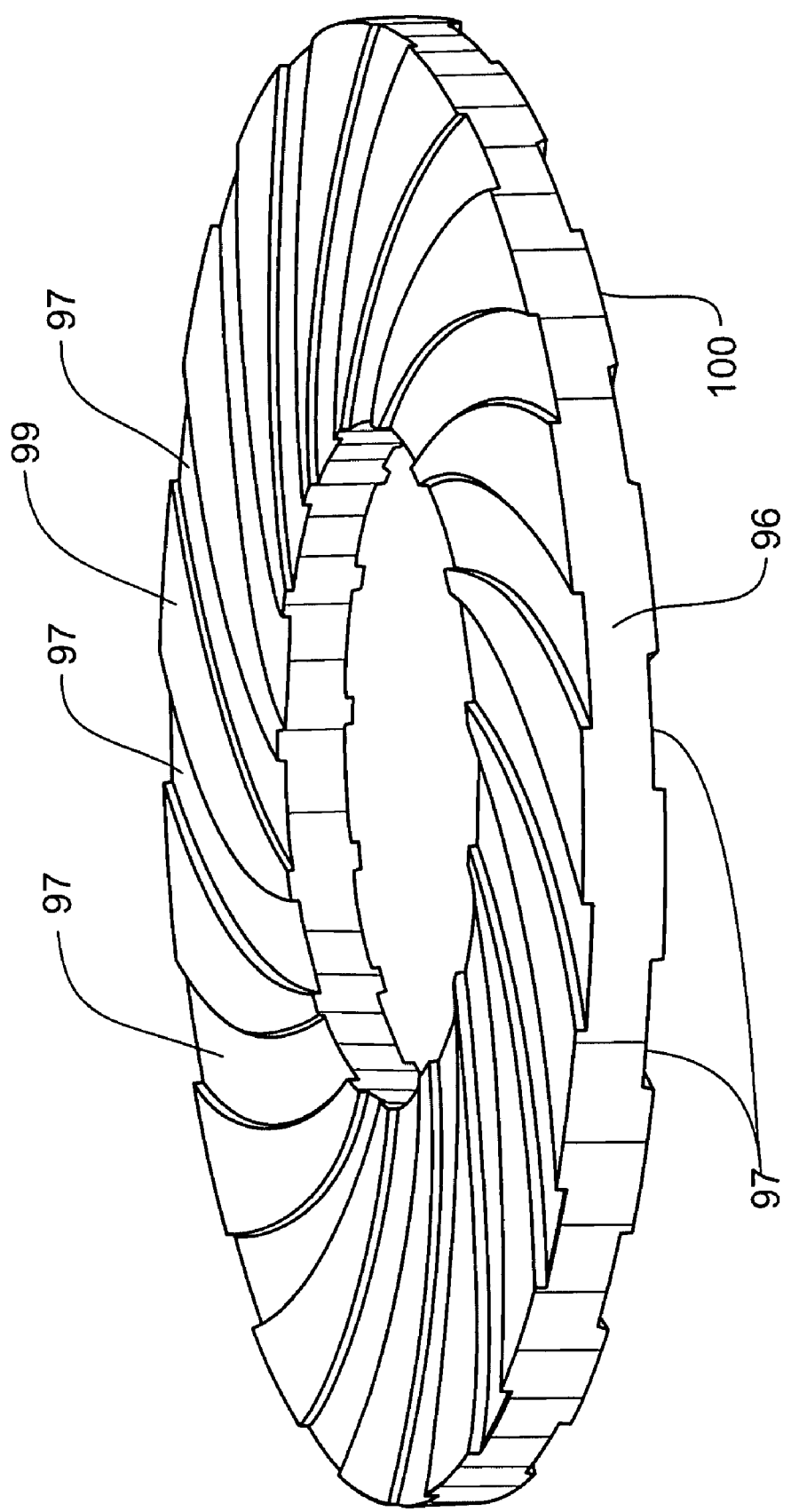
FIG. 2C is a perspective view of a type of gas generant wafer that may be used in the inflator of FIG. 2.

Referring now to FIG. 2C, an embodiment of a wafer 96 of gas generant that may be used in the present embodiments is illustrated. The wafer 96 may be used as part of the wafers 44 (shown in FIG. 2) used as part of the first quantity of gas generant 30 (shown in FIG. 2). Similarly, the wafer 96 may also be used as part of the wafers 80 (shown in FIG. 2) associated with the second quantity of gas generant 78 (shown in FIG. 2). Although only one wafer 96 is shown in FIG. 2C, when packed in an inflator, multiple wafers 96 will be stacked together (as shown in FIG. 2).

The wafer 96 includes one or more gas guiding slots 97. These gas guiding slots 97 may be positioned on the top surface 99 of the wafers 96 and/or on the bottom surface 100. As will be explained in greater detail herein, the gas guiding slots 97 in the wafers 96 allows inflation gas to go between each of the stacked wafers 96 during deployment. In some embodiments, each of the wafers 44 and 80 (shown in FIG. 2) will have the gas guiding slots 97.

Figure 3A:
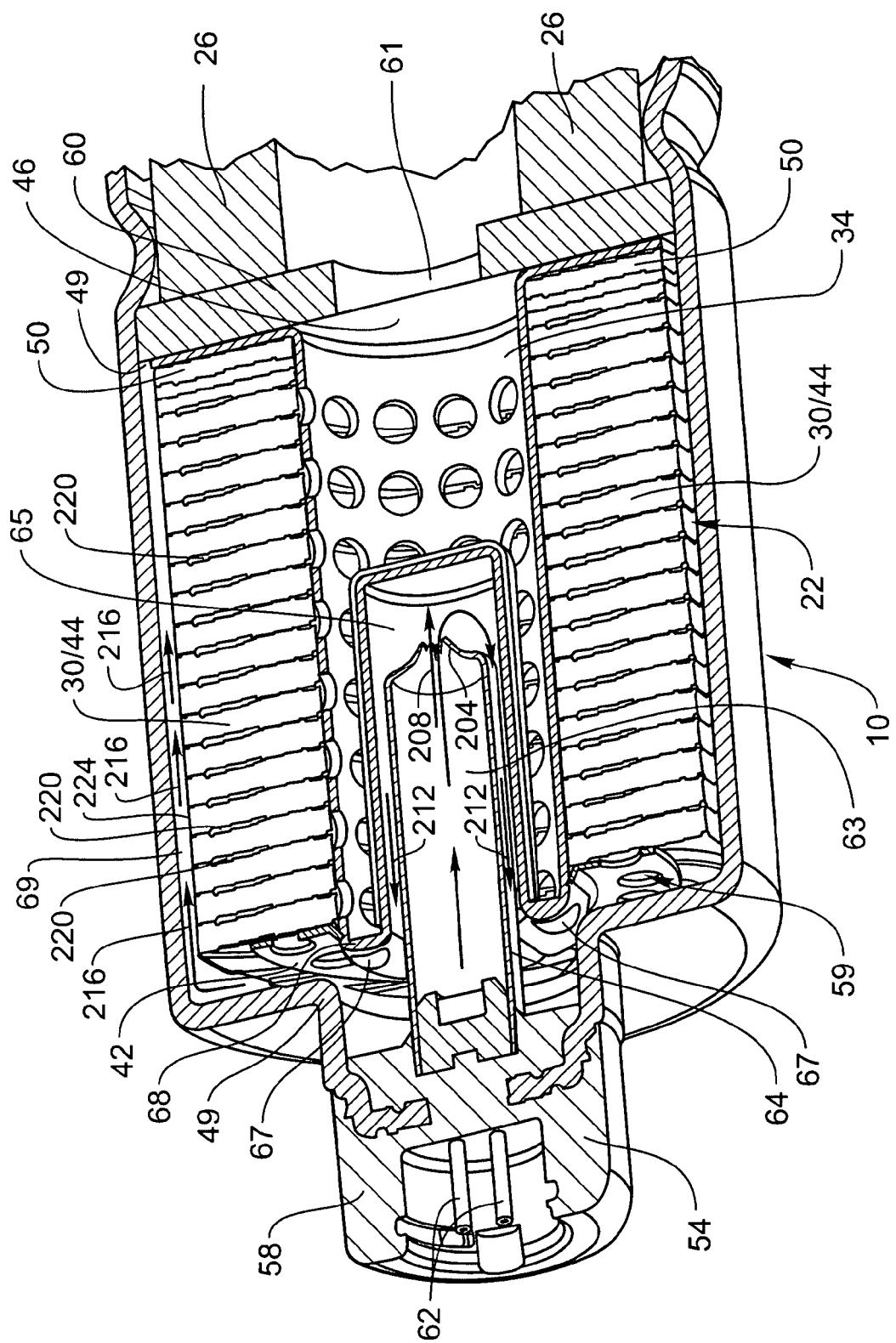
FIG. 3A is a cutaway perspective view that is similar to FIG. 2A and shows the ignition of the initiator.

Referring now to FIG. 3A, the deployment of the inflator 10 will now be discussed. FIG. 3A is a view similar to that which is shown in FIG. 2A. Upon receipt of the appropriate signal indicating crash conditions, an electrical charge (or current) will be transmitted to the first initiator 54. This signal will activate the first initiator 54. As will be explained herein, this activation of the first initiator 54 ultimately causes the first quantity of gas generant 30 (shown in FIG. 2) to ignite/combust. Such combustion/ignition of the gas generant 30 produces a first quantity of inflation gas 110 (shown in FIG. 4) that may be used to inflate an airbag.

Specifically, upon receipt of the appropriate signal, the first initiator 54 is activated and will ignite the pyrotechnic charge 63. Such combustion of the pyrotechnic charge 63 produces a quantity of hot gas. In some embodiments, flames and/or hot particles may also be produced. This produced gas results in an increased pressure within the initiator cup 64. As shown in FIG. 3A, the cup 64 may include a slit or weakened portion that forms one or more petals 204. In turn, this increase in pressure presses against petals 204, the petals 204 may open, thereby allowing the gas to escape the pyrotechnic cup 64. Such a flow of gas is illustrated by the arrow 208.

After exiting the pyrotechnic cup 64, the gas may then contact the redirecting portion 65. The redirecting portion 65 is made such that the structural integrity of the member is not compromised, even during deployment. Rather, the redirecting portion 65, which may comprise a cylindrical shaped wall that surrounds the cup 64, redirects the gas towards the end 49, as indicated by the arrow 212. In some embodiments, the redirection of the gas by the redirecting portion 65 causes the gas to reverse its direction.

When the gas accesses the end 49, the gas may then pass through the gas guide slots 67. Such passage through the gas guide slots 67 allows the gas to exit the chamber created by the redirecting portion 65. By passing through the slots 67, the gas accesses and/or is directed to the external area 69, as indicated by the arrow 216. Once the gas accesses the external area 69, the gas is exterior of the gas generant 40/wafers 44. In some embodiments, once the gas accesses the external area 69, this gas will fill the external area 69. In other embodiments, once the gas accesses the external area 69, this gas will fill the entire longitudinal length of the external area 69.

As shown above in FIG. 2C, the wafers 44 may be the wafer 96 which includes one or more slots 97. When stacked together, the slots 97 in the wafers 96 may create channels 220 (as shown in FIG. 3A) into which the gas may flow. Those skilled in the art will appreciate and understand how to stack/configure the wafers 96 to produce the channels 220. In some embodiments, this may involve having the wafers interlock and/or fit together when they are stacked. In other embodiments, this may involve changing the position of the slots 97 on each side of the wafers 96 so that, when these wafers 96 are stacked together, channels 220 are formed. Further embodiments may be designed such that the slots 97 on the top of one wafer are "the mirror image" of the slots on the bottom of an adjacent wafer 96, thereby creating a larger channel 220. Of course, other ways of configuring the slots 97 on adjacent wafers 96 are also possible, as is apparent to those skilled in the art.

As noted above, the activation of the initiator 54 fills the external area 69 with gas. This gas may flow in accordance with the path of least resistance. Accordingly, in some embodiments, the gas may flow into the channels 220. As the gas can extend along the entire longitudinal length of the external area 69, the gas may flow into all of the channels 220. Further embodiments may be designed in which the gas flows throughout the channels 220—i.e., from the end 224 of the channels 220 proximate the external area 69 to the end of the channels 220 proximate the strainer 34.

As the gas flows into the channels 220 created by the slots 97 (as shown in FIG. 2C), the gas operates to ignite the wafers 44. It should be noted one of the advantages available via the use of wafers 44 is that a uniform or substantially uniform ignition/combustion may be achieved. In fact, because the gas may access all of the channels 220 along the entire longitudinal length of the external area 69, all or substantially all of the wafers 44 may ignite simultaneously or nearly simultaneously. Other embodiments may be designed in which the wafers 44 ignite uniformly or substantially uniformly. Further embodiments may be designed in which the wafers 44 ignite non-uniformly or in a sequential order.

Figure 3B:
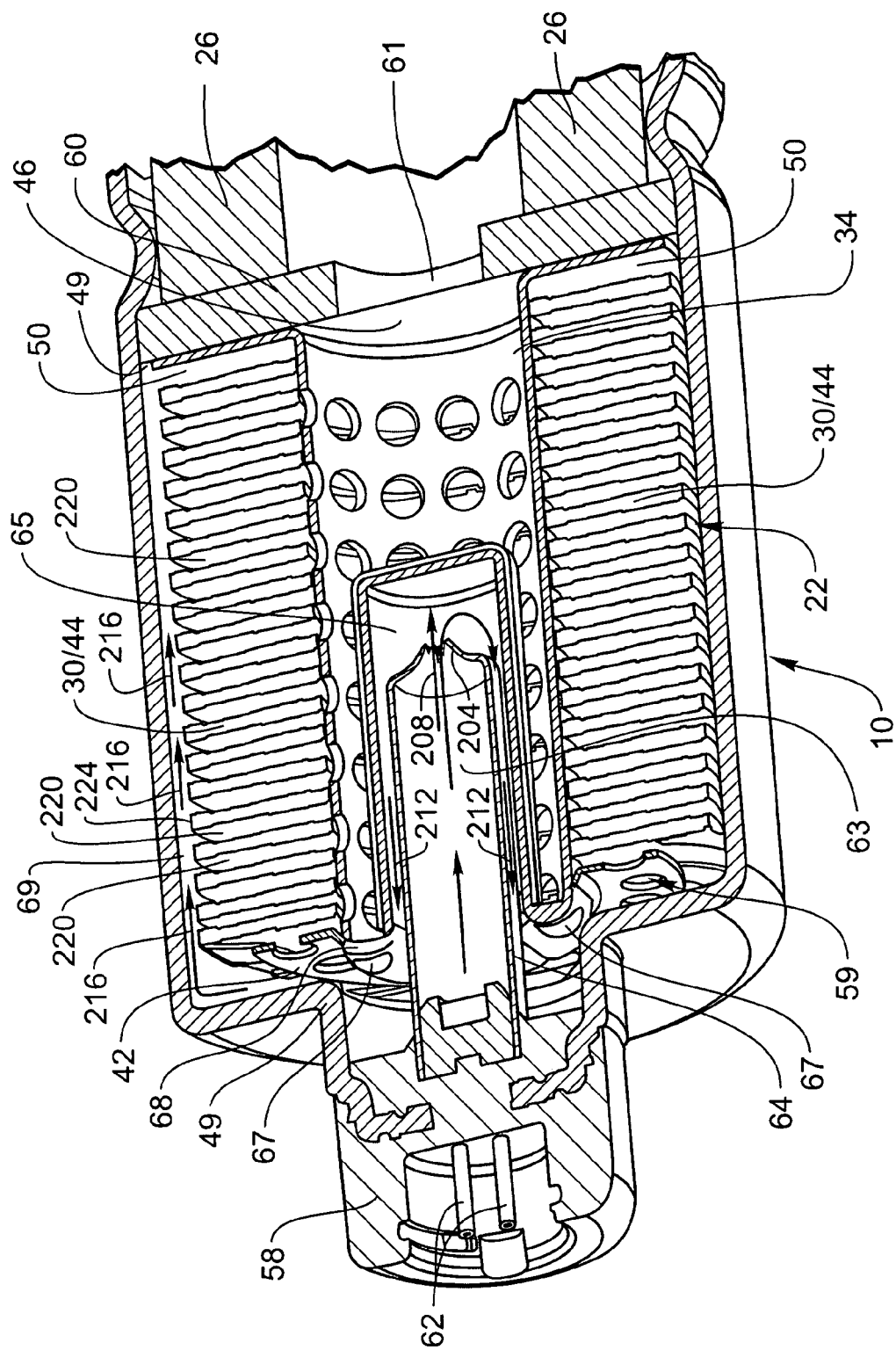
FIG. 3B is a cutaway perspective view that shows a way in which the wafers may be ignited.

Referring now to FIG. 3B, a cross-sectional view shows one embodiment of the way in which the wafers 44 may be ignited. Specifically, as the gas flows through the channels 220, the edges of the channels 220 may ignite, thereby causing the wafers 44 to thin out (or burn away), as shown in FIG. 3B. In other words, as the surface of the wafers combust, additional space between adjacent wafers 44 may be formed. This "thinning" of the wafers 44 continues until all portions of the wafer 44 have been combusted. Of course, other ways for igniting the wafers 44 may also be used.

This ignition of the wafers 44/gas generant 30 produces the quantity of inflation gas that may be used to inflate an airbag. The way in which this formed gas may be channeled out of the inflator 10 will now be described in conjunction with FIG. 3B and FIG. 4. As noted above, the first quantity of wafers 44/gas generant 30 was generally positioned exterior of the first strainer 34. Accordingly, the combustion of the first quantity of gas generant 30 occurs exterior to the first strainer 34. When the first quantity of inflation gas 110 is formed, this gas 110 is positioned (at least initially) exterior of the first strainer 34.

The formation of the first quantity of inflation gas 110 increases the pressure within the first chamber 22. Once this internal pressure exceeds a threshold level, the pressure will rupture or fail the first burst disk 46 (shown in FIG. 2). Such failing of the burst disk 46 unseals the first chamber 22. Of course, other methods for rupturing/failing the burst disk 46 may also be used.

The flow of the first quantity of inflation gas 110 will now be described in greater detail. This flow is graphically illustrated in FIG. 4 via arrow 114. As noted above, when the first quantity of gas 110 is formed such that the supply of gas is positioned exterior of the first strainer 34. The first quantity of gas 110 then flows inwardly towards the longitudinal axis 14 of the inflator 10. Generally, this inward flow of the first quantity of gas 110 occurs as the gas 110 passes through the gas flow holes 38. Once the first quantity of gas 110 has passed through the gas flow holes 38, the gas 110 is positioned within the interior of the first strainer 34. Upon reaching the interior of the first strainer 34, the gas 110 is housed within a small plenum, thereby increasing the pressure in the chamber 22. This increase in pressure caused by the formation of the first quantity of gas 110 ruptures the disk 46 (shown in FIG. 2) and allows the gas 110 to exit the first chamber 22. Such exiting of the first chamber 22 may occur by having the gas 110 flow parallel (or substantially parallel) to the longitudinal axis 14. As the first chamber 22 is no longer sealed by the burst disk 46, the first quantity of gas 110 exits the first chamber 22 by passing through the opening 124 created by the failed/ruptured burst disk 46.

Upon exiting the first chamber 22, the first quantity of gas 110 enters the space 118 surrounded by the filter 26. Upon entering the space 118, the first quantity of gas 110 flows away from the longitudinal axis 14 (i.e., outwardly) as it passes through the filter 26. Once the first quantity of gas 110 has passed through the filter 26, the gas 110 may exit the inflator 10 to inflate an airbag (not shown) by passing through the exit ports 18.

As noted above, some embodiments will be designed such that prior to deployment, the exit ports 18 are sealed by the seal 20 (as shown in FIG. 1). In such embodiments, the actuation of the inflator 10 will unseal the seal 20 so that the first quantity of gas 110 can exit the inflator 10 through the open exit ports 18. Such unsealing of the exit ports 18 can occur in a variety of different ways known in the art, including having the internal pressure of the inflator 10 caused by the creation of the first quantity of gas 110 blow out the seal 20. Other methods to fail the seal 20, such as using a projectile, cutter, etc., may also be implemented.

Figure 4:
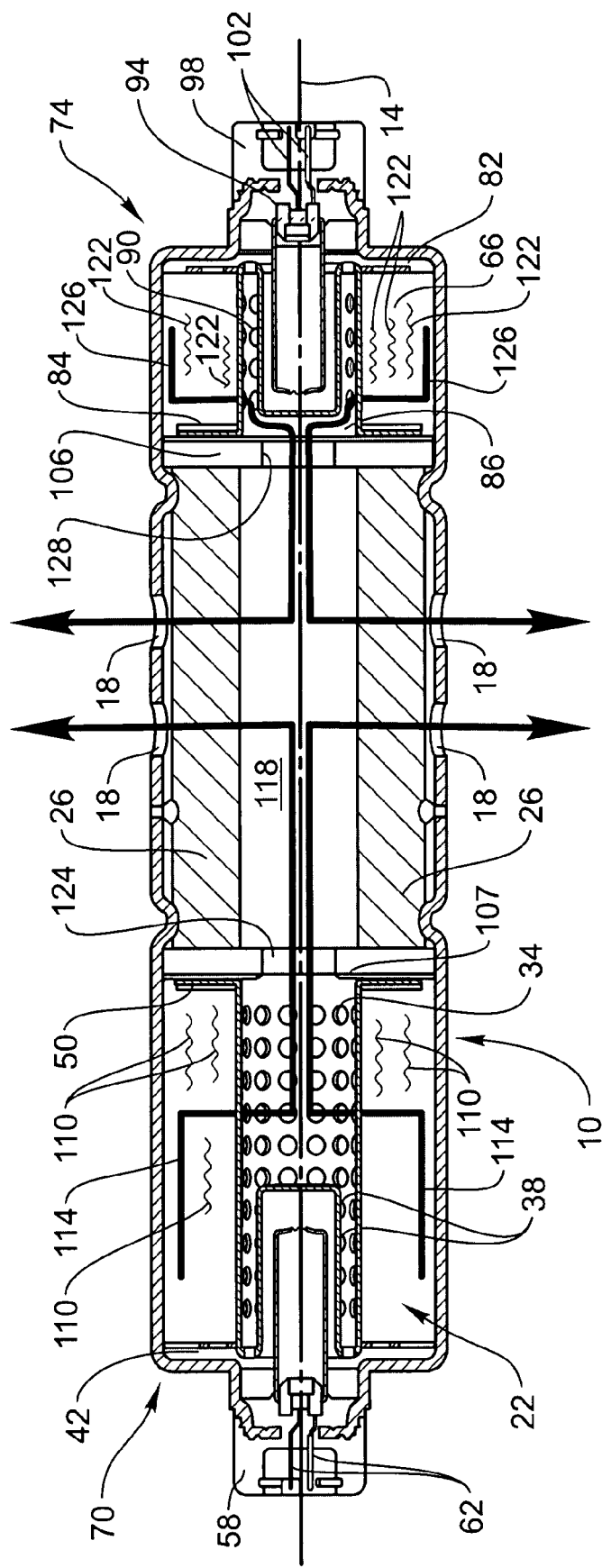
FIG. 4 is a cross-sectional view that is similar to FIG. 2 that shows the deployment of the inflator.

In the embodiment shown in FIG. 4, the inflator 10 is designed such that the first chamber 22 will deploy prior to the deployment of the second chamber 66. Of course, other embodiments may also be constructed in which the second chamber 66 deploys at the same time as the first chamber 22 deploys. Other embodiments may be constructed in which the second chamber 66 deploys prior to the deployment of the first chamber 22. Still other embodiments may be constructed in which the second chamber 66 deploys after a pre-set period of time (e.g., 3 milliseconds, 5 milliseconds, etc.) has lapsed since the activation of the first initiator 54 (shown in FIG. 2).

The deployment of the second chamber 66 will now be discussed. When a crash or accident is experienced, a signal is sent, via pins 102, to the second initiator 94. This signal activates the second initiator 94. In turn, this activation of the second initiator 94 causes the second initiator 94 to ignite the second quantity of gas generant 78 (shown in FIG. 2). Combustion of the second quantity of gas generant 78 produces a second quantity of inflation gas 122. Because the second quantity of gas generant 78 was generally positioned exterior of the second strainer 86, this ignition of the second quantity of gas generant 78 occurs exterior to the second strainer 86.

The production of the second quantity of gas 122 may, in some embodiments, occur in the same manner as that which occurred in the first chamber 22. For example, once the second initiator 94 is activated, it will ignite the pyrotechnic charge 150 (shown in FIG. 2B). Such combustion of the pyrotechnic charge 150 produces gas. (A flame and/or hot particles may also be produced). This gas will open petals in the cup that holds the charge 150. Accordingly, once these petals open, the gas may exit the cup. Upon flowing out of the cup, the gas will be redirected by the redirecting portion 158 (shown in FIG. 2B) to the gas guide slots 162 (shown in FIG. 2B). The gas guide slots 162 direct the gas and/or hot particles into the external area 172 (shown in FIG. 2B). Such movement of the gas and/or hot particles is illustrated by the arrows 176 (shown in FIG. 2B).

Once the gas and/or hot particles reaches the external area 172, this gas will freely flow and fill the external area 172, including flowing all along the longitudinal length of the external area 172. The gas may also flow into the slots 97 found in the wafers 80, and may ignite the wafers 80 in the manner described above in FIGS. 3A and 3B. (As described above, this may occur by having the wafers thin out or burn away). In some embodiments, the ignition of all or substantially all of the wafers 80 will occur simultaneously or nearly simultaneously. Other embodiments may be designed in which the flow of the gas through the slots 97 may cause a uniform or substantially uniform ignition of the wafers 80. (Those of skill in the art will recognize that the deployment of the second chamber may occur in a manner that is similar to that which was disclosed for the deployment of the first chamber.) Other embodiments may be designed in which the ignition of the wafers 80 occurs in a sequential order or in a non-uniform manner.

The formation of the second quantity of gas 122 within the second chamber 66 increases the pressure within the second chamber 66. This gas 122 may also flow internally through the second strainer 86, thereby concentrating a large quantity of gas in a small area proximate the center of the chamber 66. Once this internal pressure increases above a specified, threshold level, the internal pressure in the second chamber 66 ruptures/fails the second burst disk 106. Of course, other methods for rupturing/failing the burst disk 106 may also be used.

After the second quantity of gas 122 has been formed, this gas 122 may be vented out of the inflator 10 and used to inflate an airbag. The gas flow path associated with the second quantity of gas 122 is illustrated graphically in FIG. 4 with the arrow 126. When the second quantity of inflation gas 122 is formed, this gas 122 is positioned (at least initially) exterior of the second strainer 86. The second quantity of gas 122 then moves through the gas flow holes 90 found in the second strainer 86. In order to pass through the flow holes 90, the gas 122 moves inwardly—i.e., towards the longitudinal axis 14 of the inflator 10. The movement of the second quantity of gas 122 through the flow holes 90 results in the second quantity of gas 122 becoming positioned on the interior of the second strainer 86.

Once the second quantity of gas 122 is positioned on the interior of the second strainer 86, the second quantity of gas 122 may then flow out of the second chamber 66. This flow of the second quantity of gas 122 out of the second chamber 66 occurs by having the gas flow parallel (or substantially parallel) to the longitudinal axis 14 through the opening 128 in the second chamber 66 created by the rupture/failing of the burst disk 106. Once the second quantity of gas 122 has vented out of the second chamber 66, the gas 122 enters the space 118.

Upon entering the space 118, the second quantity of gas 122 may then flow away from the longitudinal axis 14 (i.e., outwardly) as is passes through the filter 26. Once the second quantity of gas 122 has passed through the filter 26, the gas 122 may exit the inflator 10 by passing through the exit ports 18.

In the embodiment shown in FIG. 4, the second quantity of gas 122 can mix with the first quantity of gas 110 in the space 118. Other embodiments may be constructed in which the second quantity of gas 122 mixes with the first quantity of gas 110 in the filter 26.

As shown in the embodiment of FIG. 4, the filter 26 is positioned outside of the first chamber 22 and outside of the second chamber 66. In some embodiments, this placement of the filter 26 may provide advantages. Specifically, by placing the filter 26 outside of the chambers in which combustion of the gas generant occurs (e.g., the first chamber 22 and the second chamber 66), the respective volume of these combustion chambers may be decreased. Accordingly, the overall volume of these combustion chambers may be reduced. Such a reduction in volume may provide advantages as may allow for easier ignition of the generant. In other words, as the volume is decreased, there is less volume to pressurize during the ignition event. As a result, a smaller igniter and/or initiator may be used as part of the system. This usage of a smaller igniter may be less expensive and may reduce the overall manufacturing costs.

Further, in some embodiments, positioning the filter 26 outside of one or more of the combustion chambers may reduce the noise levels associated with the ignition/combustion events. Specifically, if the filter 26 is outside of the combustion chambers, it has been found that the filter 26 can operate to absorb more of the noise that is produced during deployment. In some embodiments, this reduction in noise levels is desirable.

Referring to FIGS. 1-4 generally, those of skill in the art will appreciate that the present embodiments may provide an inflator that is smaller than other (previously known) inflators. With previously known inflators, when the gas generant is ignited, the gas formed in this reaction expands outwardly from the longitudinal axis 14. In such designs, there must be a large volume of space positioned exterior of the gas generant that receives this formed gas so that the inflator will be pressurized and the burst disk will rupture. However, with the present embodiments, this large volume of space exterior of the gas generant is not required. When the gas is formed from the combustion of the wafers 96 (either in the first chamber or the second chamber), this gas is, as shown in FIG. 4, channeled inward through the strainer (which is either the first strainer or the second strainer). This flow of gas concentrates a large quantity of inflation gas in a small plenum proximate the longitudinal axis 14 of the inflator. This concentration of gas pressurizes the chamber and results in a rupturing of the burst disk. Accordingly, the volume external of the gas generant does not have to receive this gas formed by ignition of the wafers. As a result, this area external of the wafers can be much smaller than in other inflators. In turn, making the area external of the gas generant smaller means that the overall diameter of the inflator may be reduced.

This reduction in the diameter of the inflator may provide significant advantages. For example, reducing the diameter of the inflator reduces the size of the inflator. Accordingly, less material will be needed to construct the inflator. As such, the overall costs of producing the inflator will be decreased. Further, the time associated with producing the inflator may also decrease.

Those of skill in the art will also appreciate that the present embodiments also provide for a method for deploying the inflator 10. This method involves first obtaining the inflator 10 of the present invention. Once the inflator 10 has been obtained, the first quantity of gas generant 30 that is housed within the inflator 10 is combusted. Such combustion of the first quantity of gas generant 30 produces a first quantity of inflation gas 110. As described above, this ignition of the first quantity of gas generant 30 may occur exterior of a first strainer 34. Once the first quantity of gas 110 has been formed, the gas flows towards the inflator's longitudinal axis 14 while passing through the gas flow holes 38, enters the filter 26, and then flows away from the longitudinal axis 14 as it passes through the filter 14 and exits the inflator 10.

In some embodiments, a second chamber 66 with a second quantity of gas generant 78 may also be added to the inflator 10. In these embodiments, the second quantity of gas generant 78 is also combusted to form a second quantity of inflation gas 122. As described above, this second quantity of inflation gas 122 flows towards the longitudinal axis 14 as it passes through the gas flow holes 90 in the second strainer 86, enters the filter 26, and then flows away from the longitudinal axis 14 as it passes through the filter 26 and exits the inflator 10.

It should be noted that the present embodiments relate to an inflator 10 that has an outside to inside gas flow. Among other advantages, this outside to inside gas flow allows the inflator to have a smaller diameter than that which would otherwise be expected. In some embodiments, this reduction in diameter occurs because the screen pack (i.e., the filter) is moved outside of the combustion chambers. Hence, a single filter 26 may be positioned to filter the gases generated from two combustion chambers, thereby eliminating the need for a filter for each combustion chamber. This decrease in the diameter means that the inflator is more versatile and may be used in a wide variety of applications. In other embodiments, the reduction of the diameter of the inflator may allow for more compact airbag module designs. Further embodiments may be designed in which the smaller diameter of the inflator reduces the weight of the inflator and/or reduces the costs associated with producing the inflator.

Further, embodiments described herein use wafers as the gas generant. In certain embodiments, the use of such wafers may provide advantages. For example, the use of wafers as the gas generant (rather than tablets or other types of gas generant) produces a more consistent and constant combustion pressure within the combustion chamber(s). In some embodiments, this combustion pressure may be at least 2000 PSI and may be achieved within about 20 milliseconds and may, in some embodiments, be maintained for 100 milliseconds (or even longer). This constant combustion pressure improves the effluents that are emitted from the inflator as smaller amounts of undesired side products are formed during the combustion process. Accordingly, the effluents flowing out of the inflator may be better and of higher quality when wafers are used. Moreover, when wafers having the gas guiding slots formed therein, such as the type shown and described herein are used, a more consistent combustion pressure may, in some embodiments, be formed as the gas guiding slots allow for a quick and consistent ignition/combustion process.

As shown in FIGS. 2A and 2B, the gas guiding slots will guide the gas/flames formed in the initiator. In some embodiments, this feature may be advantageous as it allows an inflator to be constructed with a single (or single piece) igniter (initiator). Separate parts (including a separate "ignition cup") may not be required. The elimination of the "ignition cup" or other components reduces the number of parts associated with the inflator and reduces the costs associated with manufacturing. Also, such a reduction in the number of parts may simplify the assembly of the inflator and may reduce the number of assembly lines/assembly processes required during the manufacturing process. Further, with the present embodiments, all that may be required is to create the two chambers with the wafers and then position the strainers (and the initiators) within the chambers. The strainer may be attached to the cup/initiator as a single piece that is inserted rapidly into the proper position. As such, the inflator may be rapidly and easily constructed.

In other embodiments, the wafer retainer rings and/or other features of the inflator may have parts stamped therein (such as the gas guiding slots). Such stampings are of high strength, even though the overall part may be classified as being "light weight." This stamping may reduce the cost and the number of parts associated with the inflator. (This stamping may reduce the number of parts and combine several functions into a single stamping). Such a reduction in parts may occur as the stamped slots guide the gas flow and thus, no additional feature for guiding the gas may be required.

The above-recited advantages may be associated with one or more of the present embodiments. The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator having a longitudinal axis, the inflator comprising:
   a first chamber comprising a first quantity of gas generant;
   a redirecting portion disposed within the first chamber;
   a first strainer comprising a plurality of gas flow holes, the first strainer being positioned within the first chamber, wherein the first quantity of gas generant being located exterior of the strainer; and
   a filter positioned outside of the first chamber,
   wherein an igniter gas produced by the ignition of a pyrotechnic charge is redirected by the redirecting portion to the exterior of the gas generant causing combustion of the first quantity of gas generant producing a first quantity of gas that flows towards the longitudinal axis through the gas flow holes, enters the filter, and then flows away from the longitudinal axis through the filter.

2. An inflator as in claim 1 wherein after the first quantity of gas flows through the filter, the gas exits the inflator through one or more exit ports.

3. An inflator as in claim 1 wherein a burst disk is positioned between the first chamber and the filter.

4. An inflator as in claim 1 wherein the combustion of the first quantity of gas generant occurs exterior to the first strainer.

5. An inflator as in claim 1 further comprising a first initiator that is attached to the first chamber.

6. An inflator as in claim 1 further comprising a second chamber, wherein the first chamber is positioned at a first end of the inflator and the second chamber is positioned at a second end of the inflator.

7. An inflator as in claim 6 wherein the second chamber comprises a second quantity of gas generant and a second strainer, wherein the second strainer comprises a plurality of gas flow holes, the second supply of gas generant being located exterior of the second strainer; and wherein combustion of the second quantity of gas generant produces a second quantity of gas that flows towards the longitudinal axis through the gas flow holes in the second strainer, enters the filter, and then flows away from the longitudinal axis through the filter.

8. An inflator as in claim 7 wherein the combustion of the first quantity of gas generant occurs exterior of the first strainer and ignition of the second quantity of gas generant occurs exterior of the second strainer.

9. An inflator as in claim 7 wherein both the first quantity of gas generant and the second quantity of gas generant comprise wafers.

10. An inflator as in claim 6 further comprising a second initiator that is attached to the second chamber.

11. An inflator as in claim 6, further comprising a second burst disk that seals the second chamber.

12. An inflator as in claim 1 further comprising an external area that is external of the first quantity of gas generant.

13. An inflator having a longitudinal axis, the inflator comprising:
   a first chamber comprising a first quantity of gas generant;
   an initiator having a pyrotechnic charge;
   a redirecting portion disposed within the first chamber; and
   a first strainer comprising one or more gas flow holes, the first quantity of gas generant being located exterior of the first strainer;
   wherein activation of the initiator causes an igniter gas to contact the redirecting portion and to be redirected to the exterior of the gas generant causing combustion of the first quantity of gas generant that occurs exterior of the first strainer and produces a first quantity of gas that flows towards the longitudinal axis while passing through the gas flow holes, exits the first chamber, and then flows away from the longitudinal axis as it exits the inflator.

14. An inflator as in claim 13 further comprising a second chamber, the second chamber having a second quantity of gas generant and a second strainer, the second quantity of gas generant being located exterior of the second strainer, wherein combustion of the second quantity of gas generant occurs exterior of the second strainer and produces a second quantity of gas that flows towards the longitudinal axis while passing through one or more gas flow holes in the second strainer, exits the second chamber, and then flows away from the longitudinal axis as it exits the inflator.

15. An inflator as in claim 14 wherein the first quantity of gas generant and the second quantity of gas generant comprise wafers.

16. A method deploying an inflator having a longitudinal axis, the method comprising the steps of:
   obtaining an inflator, the inflator comprising:
      a first chamber comprising a first quantity of gas generant;
      a redirecting portion disposed within the first chamber;
      a first strainer comprising a plurality of gas flow holes, the first strainer being positioned within the first chamber, first quantity of gas generant is located exterior of the first strainer; and
      a filter positioned outside of the first chamber;
   directing an igniter gas exiting an initiator via the redirecting portion to the exterior of the gas generant;
   combusting the first quantity of gas generant to produce a first quantity of gas, wherein combustion of the first quantity of gas generant occurs exterior to the first strainer;
   venting the first quantity of gas by having the gas flow towards the longitudinal axis while passing through the gas flow holes, enter the filter, and then flow away from the longitudinal axis as it passes through the filter and exits the inflator.

17. A method as in claim 16 wherein the inflator further comprises a second chamber, wherein the first chamber is positioned at a first end of the filter and the second chamber is positioned at a second end of the filter, the second chamber comprising a second supply of gas generant and a second strainer that includes a plurality of gas flow holes, wherein the second quantity of gas generant is located exterior of the second strainer.

18. A method as in claim 17 further comprising the step of combusting the second quantity of gas generant to produce a second quantity of gas, wherein the second quantity of gas flows towards the longitudinal axis as it passes through the gas flow holes in the second strainer, enters the filter, and then flows away from the longitudinal axis as it passes through the filter and exits the inflator.

19. A method as in claim 18 wherein the second quantity of gas mixes with the first quantity of gas in the filter.

* * * * *

UNITED STATES PATENT AND TRADEMARK OFFICE
CERTIFICATE OF CORRECTION

PATENT NO. : 7,712,778 B2
APPLICATION NO. : 11/978254
DATED : May 11, 2010
INVENTOR(S) : Bradley W. Smith et al.

It is certified that error appears in the above-identified patent and that said Letters Patent is hereby corrected as shown below:

In column 18, claim 16, line 20, please replace "chamber, first" with --chamber, the first--

In column 18, claim 16, line 20, please replace "generant is located" with --generant being located--

Signed and Sealed this

Sixth Day of July, 2010

David J. Kappos
*Director of the United States Patent and Trademark Office*